(12) United States Patent
Harada et al.

(10) Patent No.: US 7,213,478 B2
(45) Date of Patent: May 8, 2007

(54) METHOD FOR AUTOMATIC CONFIGURATION OF PROCESSING SYSTEM

(75) Inventors: Satoshi Harada, Nirasaki (JP); Edward C. Hume, III, Austin, TX (US); James E Willis, Austin, TX (US); Kevin Andrew Chamness, Austin, TX (US); Hieu A Lam, Richardson, TX (US); Hongyu Yue, Plano, TX (US); David Fatke, Austin, TX (US)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 10/776,452

(22) Filed: Feb. 12, 2004
(Under 37 CFR 1.47)

(65) Prior Publication Data

US 2005/0015176 A1    Jan. 20, 2005

Related U.S. Application Data

(60) Provisional application No. 60/491,286, filed on Jul. 31, 2003, provisional application No. 60/448,319, filed on Feb. 18, 2003.

(51) Int. Cl.
*G01N 19/00* (2006.01)
(52) U.S. Cl. ......................... 73/865.9; 700/121; 73/1.01
(58) Field of Classification Search ................. 73/1.01, 73/865.9; 700/121
See application file for complete search history.

(56) References Cited

U.S. PATENT DOCUMENTS

| | | | |
|---|---|---|---|
| 5,355,320 A | | 10/1994 | Erjavic et al. |
| 5,461,570 A | * | 10/1995 | Wang et al. ................. 700/110 |
| 5,586,041 A | * | 12/1996 | Mangrulkar ................ 700/174 |
| 6,098,116 A | * | 8/2000 | Nixon et al. ................... 710/8 |
| 6,263,255 B1 | * | 7/2001 | Tan et al. ................... 700/121 |
| 6,445,969 B1 | | 9/2002 | Kenney et al. |
| 6,556,884 B1 | * | 4/2003 | Miller et al. ................ 700/121 |
| 6,560,503 B1 | * | 5/2003 | Toprac et al. ............... 700/108 |
| 6,622,059 B1 | * | 9/2003 | Toprac et al. ............... 700/121 |
| 6,647,309 B1 | * | 11/2003 | Bone .......................... 700/121 |

(Continued)

FOREIGN PATENT DOCUMENTS

| | | |
|---|---|---|
| EP | 0 643 344 A1 | 3/1995 |
| EP | 0 686 900 A2 | 12/1995 |
| WO | WO 01/25865 A1 | 4/2001 |

OTHER PUBLICATIONS

"Features and Benefits," Internet Article, http://web.archive.org/web20020815010634/www.wonderware.com/products/analytical/qianalyst/features.asp. (XP002308756), 16 pp, (Aug. 15, 2002).

(Continued)

*Primary Examiner*—Hezron Williams
*Assistant Examiner*—Rodney Frank
(74) *Attorney, Agent, or Firm*—Pillsbury Winthrop Shaw Pittman LLP

(57) ABSTRACT

A method of automatically configuring an Advanced Process Control (APC) system for a semiconductor manufacturing environment in which an auto-configuration script is generated for executing an auto-configuration program. The auto-configuration script activates default values for input to the auto-configuration program. The auto-configuration script is executed to generate an enabled parameter file output from the auto-configuration program. The enabled parameter file identifies parameters for statistical process control (SPC) chart generation.

36 Claims, 4 Drawing Sheets

U.S. PATENT DOCUMENTS

| | | | |
|---|---|---|---|
| 6,704,920 B2 * | 3/2004 | Brill et al. | 716/19 |
| 6,804,619 B1 * | 10/2004 | Chong et al. | 702/84 |
| 6,871,112 B1 * | 3/2005 | Coss et al. | 700/121 |
| 6,944,662 B2 * | 9/2005 | Devine et al. | 709/225 |
| 2005/0187649 A1 * | 8/2005 | Funk et al. | 700/121 |
| 2006/0079983 A1 * | 4/2006 | Willis | 700/108 |

OTHER PUBLICATIONS

"Industrial SQL Server 8.0," Internet Article, http://web/archiv.org/20021001201810/www.wonderware.com/products/historian/insql (XP002311924), 8 pp, (Oct. 1, 2002).

Fraleigh, Steven et al., "Visual programming of on-line systems for continuous process improvement," Proceedings, Conference on Control Applications, IEEE (New York), vol. 2 (No. 3), pp. 1289-1295, (Aug. 24-26, 1994).

U.S. Appl. No. 60/414,425, filed Sep. 30, 2002, Funk.
U.S. Appl. No. 60/393,104, filed Jul. 3, 2002, Funk.
U.S. Appl. No. 60/393,091, filed Jul. 3, 2002, Funk.
U.S. Appl. No. 60/383,619, filed May 29, 2002, Funk.
U.S. Appl. No. 60/374,486, filed Apr. 23, 2002, Funk.
U.S. Appl. No. 60/368,162, filed Mar. 29, 2002, Funk.
U.S. Appl. No. 60/404,412, filed Aug. 20, 2002, Funk.

* cited by examiner

METHOD FOR AUTOMATIC CONFIGURATION OF PROCESSING SYSTEM

This non-provisional application claims the benefit of U.S. Provisional Application Ser. No. 60/448,319, entitled "Method for automatic configuration of a processing system", filed on Feb. 18, 2003; and U.S. Provisional Application Ser. No. 60/491,286, entitled "Method for automatic configuration of a processing system", filed on Jul. 31, 2003, the contents of both of which are incorporated herein in their entirety by reference.

CROSS-REFERENCE TO RELATED APPLICATIONS

This application is related to U.S. Provisional application Ser. No. 60/414,425, entitled "Method and apparatus for the monitoring and control of a semiconductor manufacturing process", filed on Sep. 30, 2002; U.S. Provisional application Ser. No. 60/393,104, entitled "Method and apparatus for automatic sensor installation", filed on Jul. 3, 2002; U.S. Provisional application Ser. No. 60/393,091, entitled "Method for dynamic sensor configuration and runtime execution", filed on Jul. 3, 2002; U.S. Provisional application Ser. No. 60/383,619, entitled "Method and apparatus for monitoring tool performance", filed on May 29, 2002; U.S. Provisional application Ser. No. 60/374,486, entitled "Method and apparatus for simplified system configuration", filed on Apr. 23, 2002; U.S. Provisional application Ser. No. 60/368,162, entitled "Method for interaction with status and control apparatus", filed on Mar. 29, 2002; and U.S. Provisional application Ser. No. 60/404,412, entitled "Method for processing data based on the data content", filed on Aug. 20, 2002. The entire contents of all of these applications are herein incorporated by reference in their entirety.

FIELD OF THE INVENTION

The present invention relates to a method for automatic configuration of a processing system, and more particularly to a method of automatically configuring a processing system for run-to-run control.

BACKGROUND OF THE INVENTION

Computers are generally used to control, monitor, and/or initialize manufacturing processes, such as operations in a semiconductor manufacturing plant. Various input/output (I/O) devices are used to control and monitor process flows, wafer states, and maintenance schedules. A variety of tools exist in a semiconductor manufacturing plant to complete these complicated steps from critical operations such as material etch, to material deposition, and device inspections. Most tool installations are accomplished using a display screen that is part of the graphical user interface (GUI) of a control computer containing the installation software. Installation of a semiconductor-processing tool is a time consuming procedure.

With semiconductor processing, processing conditions change over time. In many cases, changes of process data reflecting deterioration of processing characteristics cannot be detected by simply referring to the process data displayed. It is difficult to detect early stage abnormalities and characteristic deterioration of a process. Oftentimes prediction and pattern recognition offered by advanced process control (APC) is necessary.

Facility control is often performed by a number of different control systems having a variety of controllers. Some of the control systems may have man-machine interfaces such as touch screens, while others may only collect and display one process variable. The monitoring system must be able to collect data tabulated for the process control system. The data collection of the monitoring system must handle various data sets including univariate and multivariate data, various data processes including data analysis and data display, and/or various data selection capabilities including the ability to select the process variables to collect. If the process data is displayed and detected automatically, the optimum process conditions of a mass-production line can be set and controlled through statistical process control (SPC) charts. Inefficient monitoring of a facility can result in facility downtimes that add to the overall operational cost.

SUMMARY OF THE INVENTION

A method for automatic configuration of a processing system includes generating an auto-configuration script for executing an auto-configuration program. The auto-configuration script activates default values for input to the auto-configuration program. The auto-configuration script is executed to generate an enabled parameter file output from the auto-configuration program. The enabled parameter file identifies parameters for statistical process control (SPC) chart generation.

DETAILED DESCRIPTION OF AN EMBODIMENT

Figure 1:
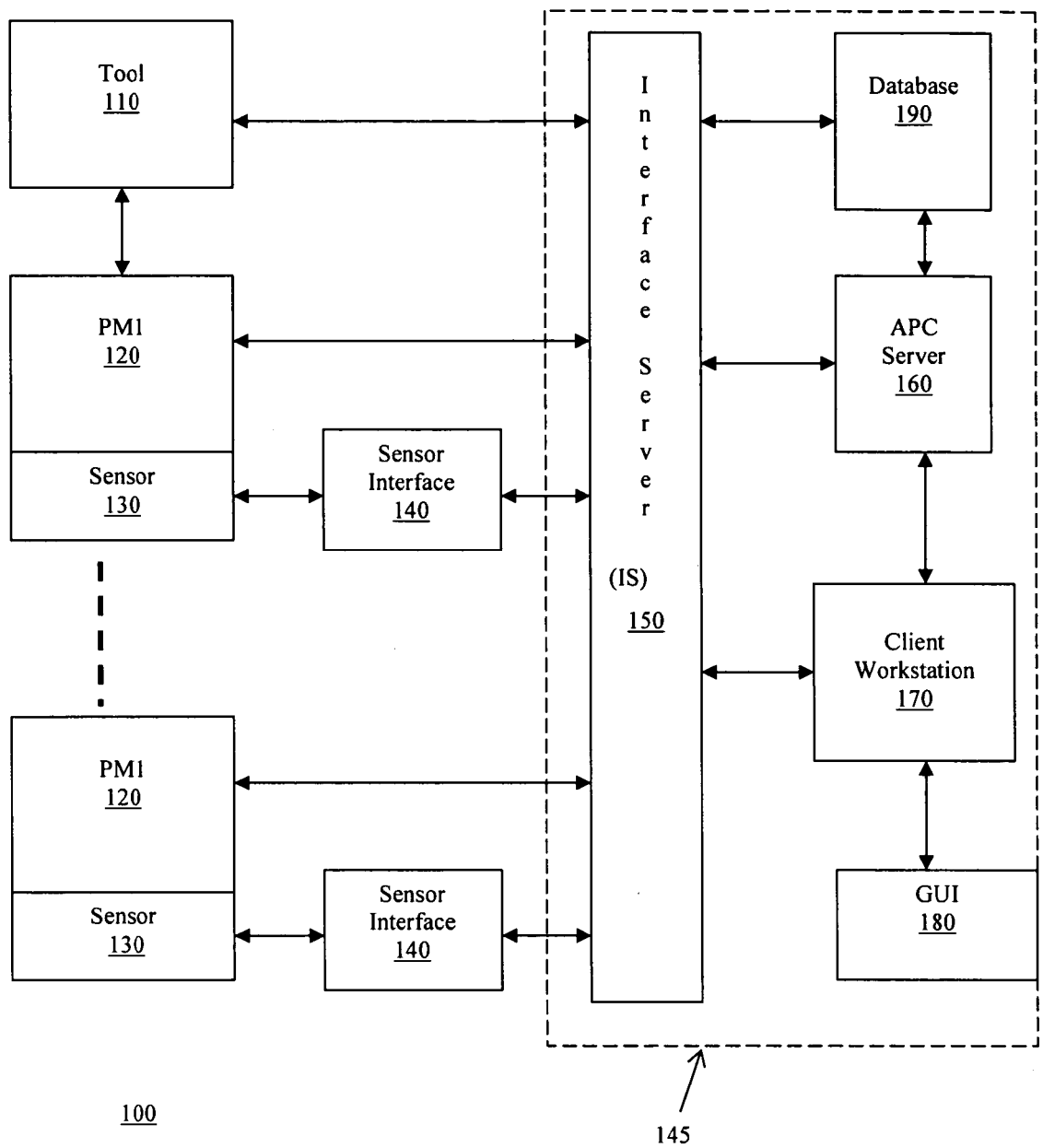
FIG. 1 illustrates a schematic block diagram of an Advanced Process Control (APC) system in a semiconductor manufacturing environment.

FIG. 1 shows an exemplary block diagram of an APC system in a semiconductor-manufacturing environment. In the illustrated system, semiconductor manufacturing environment 100 comprises semiconductor processing tool 110, multiple process modules 120, PM1 through PM4, sensors 130, sensor interface 140, and APC system 145. For example, sensor 130 can comprise an optical emission spectroscopy (OES) sensor for monitoring plasma conditions, a voltage/current probe (VIP) for monitoring RF signals, and/or analog sensors for measuring other process parameters such as pressure, mass flow rates, and temperature. APC system 145 can comprise interface server (IS) 150, APC server 160, client workstation 170, GUI 180, and database 190. For example, IS 150 can comprise a real-time memory database that is sometimes referred to as a "Hub".

Additionally, for example, the APC server 145 can be coupled to an intranet, wherein the intranet further provides an Internet server (not shown) for accessing the Internet. The intranet may, for example, provide interconnectivity at a customer site, such as a device maker site. Moreover, APC system 145 can, for example, be accessible remotely by a computer system (not shown) remotely located at a vendor site, such as an equipment manufacturer. The remotely located computer system can access data on the APC system, and further provide control information to the APC system 145 via the Internet.

In the illustrated system, a single tool 110 is shown along with four process modules 120. The APC system 145 can interface with a number of processing tools including cluster tools having one or more process modules. For example, the tools can be used to perform etching, deposition, diffusion, coating, oxidation, cleaning, ashing, measurement, transfer, loading, and unloading processes. Moreover, the APC system 145 can collect, process, store, display, input, and output data from these processing tools, process modules, and sensors.

Additionally, processing tool 110 can comprise a tool agent (not shown), which can be a software process that runs on a tool 110 and which can provide event information, context information, and start-stop timing commands used to synchronize data acquisition with the tool process. Also, APC system 145 can comprise an agent client (not shown) that can be a software process that can be used to provide a connection to the tool agent.

In this embodiment, the APC server 160 automates the configuration of the APC system so that the automatic creation of statistical process control (SPC) charts can be configured and enabled immediately following installation. During installation, the installer of the software can be required to provide information about the hardware configuration (such as IP address, number and type of process modules 120). During installation, the system can be automatically configured for default data collection. The default configuration can allow for data collection of all tool level trace parameters as well as the calculation of all summary parameters. Alternately, the default configuration can also include at least one external sensor.

After installation, the APC system can be automatically configured for fault detection using SPC run rule evaluation. Each of the available summary statistics (average, standard deviation, minimum, maximum, etc.) for each of the available trace parameters is a candidate for automatic SPC chart creation. Tool level trace parameters can comprise measured and reported values of process variables, such as, for etch systems, gas flow rates, RF power, RF reflected power, peak-to-peak voltage, pressure, temperature, etc. Mapping of the available parameters and statistics to enabled parameters is based on the installer's or operator's recommendations and the process specific requirements.

Auto configuration can be re-run at any time after installation if the selection of parameters change.

Once installed, at run-time, as new recipes are encountered, SPC charts can be automatically created for tracking controlled and non-controlled enabled parameters during process steps, such as RF steps in an etch system. Controlled parameters comprise trace parameters,that have a setpoint. These parameters are controlled on the tool to within some tolerance based on a percentage deviation from the setpoint or absolute deviation from setpoint. For a given recipe and process step, some controlled parameters can have setpoints that are zero. In this case, the percentage deviation from setpoint technique cannot be used because it would require division by zero. Non-controlled parameters comprise trace parameters without setpoints. The values of these parameters typically depend on the setpoints of the controlled parameters. After a configurable number of wafers have accumulated in each automatically created chart and if the auto calculation flag is enabled for that parameter, the upper and lower control limits can be automatically calculated and the chart enabled for alarms based on SPC run rule evaluation.

During installation, the installer provides information relating to the hardware configuration of the tool, including the type of modules that are installed. For example, a number of questions can be used, and the installer can be prompted to answer. Selection of a particular type of process module then automatically configures the default data collection plan for that process module. The default data collection plans are based on information provided by an installer, a process engineer, and possibly the process requirements. Not all of the parameters specified in the data collection plan will be enabled for automatic SPC chart creation. The list of parameters that are enabled for automatic SPC charting can be provided by the auto-configuration script and based on best known practices or the process requirements. The auto configuration script can be executed at any time after installation.

Default selection of enabled parameters is provided based on best known practices. However, the installer can override the default values using an auto-configuration data file, such as an Excel spreadsheet, provided for the purpose of selecting a different set of enabled parameters. Enabled parameters are those parameters selected for automatic SPC chart creation.

The initial values for the enable/disable flags are set by the auto-configuration script based on selections made in the Auto Configuration data file, such as an Auto Configuration Excel spreadsheet.

Figure 2:
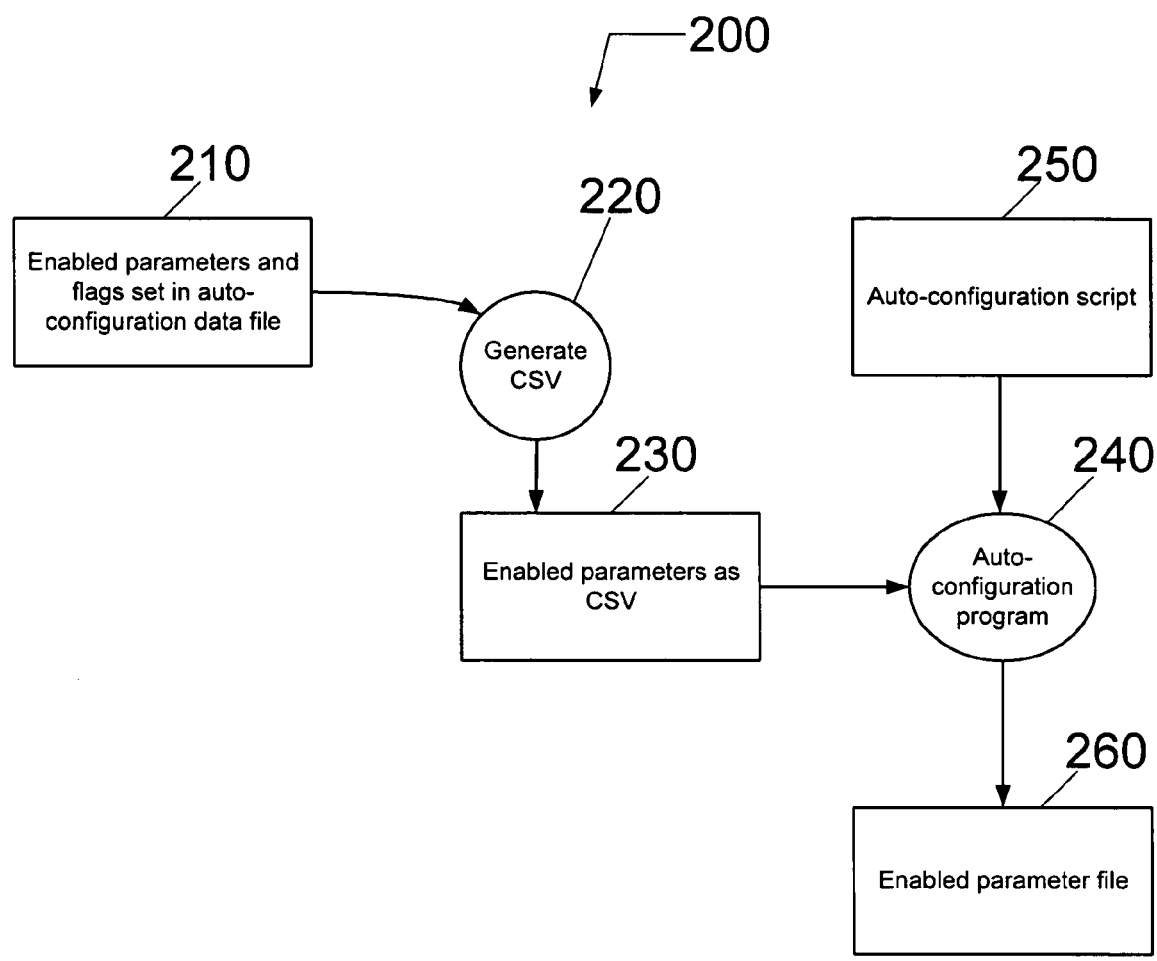
FIG. 2 presents a flowchart describing the automatic configuration of an APC system according to an embodiment of the present invention.

FIG. 2 illustrates a flowchart 200 depicting these interrelations. For example, the Auto Configuration data file including enabled parameters can be created by the installer using a spreadsheet at 210 and a Comma Separated Values (CSV) file 230 with enabled parameters is generated at 220. The list of enabled parameters 230 is read by an auto-configuration program 240 upon the execution of an auto-configuration script 250, wherein the information provided in the CSV file 230 overrides the default values, and a table of enabled parameters 260 is created in the persistent database.

Additionally, the auto configuration script can embody any of the following: (1) requesting information about the tool configuration as required to support this feature; (2) configuring default data collection plans per process module based on the installer's selection of module type; (3) basing the default data collection plans on best known practices as provided by the operator (or installer); (4) providing default data collection plans for including default step trimming information; (5) providing information necessary for the system to select the parameters that are enabled for automatic SPC chart creation using an auto-configuration data file, such as an Excel spreadsheet, based on the module type and best known practices; (6) providing the possibility to replace the default set of enabled parameters with a set provided by the process user at any time following installation, wherein the replacement set of parameters can be specified in an auto-configuration data file, such as an Excel spreadsheet; (7) providing the availability of the list of parameters that are enabled for automatic SPC chart creation in the persistent database; and/or (8) providing a system level mechanism to enable/disable the "automatic SPC charts creation".

Figure 3:
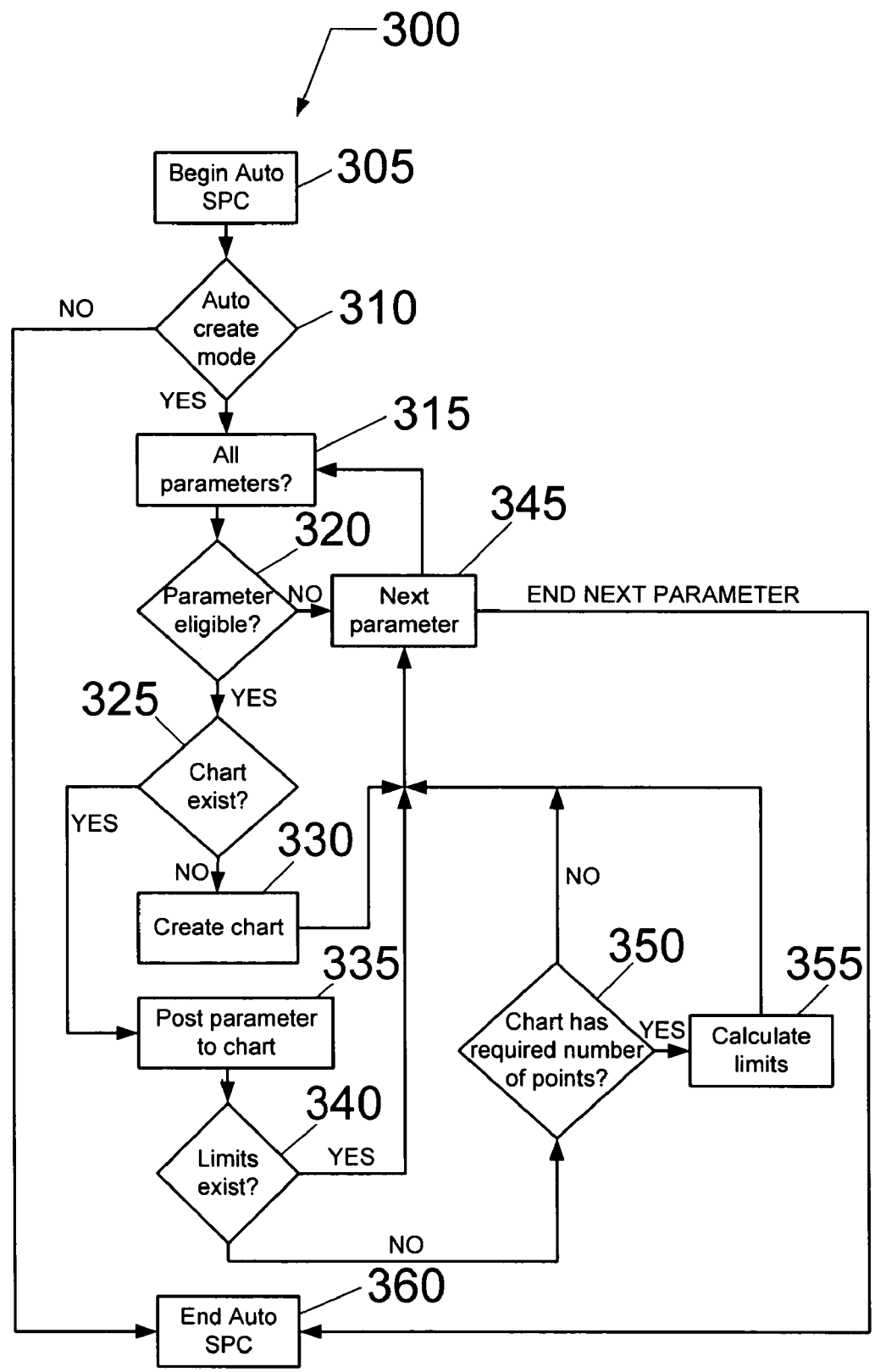
FIG. 3 presents a flowchart describing the automatic creation of statistical process control (SPC) charts according to an embodiment of the present invention.

FIG. 3 illustrates a flowchart describing a method 300 for the automatic creation of SPC charts. At 305, the Auto SPC algorithm is initiated, and, at 310, an auto creation mode query is performed; for example, an installer or operator can be prompted to answer one or more questions. If not, the method 300 is terminated at 360. If the Auto create mode is required, a determination is made at 315 to identify those parameters for which SPC charts are to be automatically created.

At 320, the eligibility of each parameter for SPC chart creation is assessed. If a parameter is deemed ineligible, then the next parameter is addressed at 345. If a parameter is deemed eligible, a query is performed to determine if an SPC chart exists for the parameter at 325. If not, then an SPC chart is created at 330, and the next parameter is addressed at 345. If an SPC chart exists, then the parameter is posted to the SPC chart at 335.

At 340, a query is performed to determine if control limits exist for the given SPC chart. If control limits exist, then the next parameter is addressed at 345. If control limits do not exist, then a query is performed to determine if the SPC chart possesses a sufficient number of data points to calculate control limits at 350. If so, then control limits are calculated at 355. If not, then the next parameter is addressed at 345. When the last parameter is reviewed at 345, and no additional parameters exist, then the method 300 is terminated at 360.

For example, parameters that are representative of a process step, such as an RF step in an etch process, are automatically posted to the appropriate SPC chart. If the chart does not exist, it is automatically created but without upper and lower control limits. A new chart is created for each combination of module, recipe, parameter and process step. Thus, if there are 10 parameters and 50 recipes each having 5 process steps, this process will create 2500 SPC charts (the number of SPC charts created is the product of the number of parameters times the number of recipes times the number of process steps in each recipe). The SPC charts that are created automatically must be distinguishable from charts that are created manually. SPC charts whose upper and lower control limits have not been set are not subject to run rule evaluation, thus no alarms will be generated. Therefore, a new chart is created for each module, new recipe, for each enabled parameter and for each process step that is encountered. The charts thus created will be accessed by the user (using a GUI) in the same way as SPC charts that were created manually.

Additional embodiments of the auto-configuration system for the automatic creation of SPC charts for univariant parameters that are representative of a process step can include any of the following: (1) each process step is defined as "a step during which a summary parameter value (for example, forward RF power to a lower electrode) is greater than the threshold value"; (2) a graphic user interface (GUI) can be available to allow the user to select the summary parameter used to define a process step; (3) a GUI can be available to allow the user to select the threshold value; (4) at run-time, when a new recipe is encountered, if the "automatic SPC chart creation" is "enabled" and the chart does not already exist (created either manually or automatically), a chart can be created automatically for each enabled parameter that is representative of an RF step; (5) each enabled parameter can have a flag to designate manual or automatic limits setting; (6) if "automatic limits" is selected, initially the SPC chart created can not have upper or lower control limits and run rule evaluation can be disabled; (7) if "manual limits" is selected, the limits on each chart created can be set based on the values entered in the spreadsheet and run rule evaluation can be enabled according to the run rule evaluation settings; (8) the names of SPC charts that are generated automatically can be unique; (9) SPC charts thus created can be available for editing using the normal SPC chart GUI; (10) in addition to the SPC chart, analysis plans and strategies can be created automatically; (11) the associated analysis plans and strategies thus created can be available for editing using the normal analysis plans and strategies GUI; (12) SPC charts that are created automatically can be distinguishable by the user from charts that were created manually; (13) the associated analysis plans and strategies that are created automatically can be distinguishable by the user from analysis plans and strategies that were created manually; and/or (14) the alarms thus generated can in turn generate notifications and interventions based on the settings default notifications and interventions for "RF step parameters" SPC chart.

Note that SPC charts that are created automatically appear in the Analysis Strategy in the same way as SPC charts that are created manually. Once created, population of the charts occurs regardless of the state of the "auto SPC chart creation" flags. Thus, once created, if population is no longer desired, each SPC chart can be manually unassociated from the Analysis Strategy, and a GUI can provide a means to unassociate analysis plans and charts from an Analysis Strategy.

In order to facilitate automatic creation of SPC charts and control limits, limits can be automatically calculated based on the standard deviation of the points assigned to the chart. In this example, parameters that are representative of a process step, such as an RF step in an etch system, are automatically posted to the appropriate SPC chart. Once the number of points on the chart reaches a configurable value (e.g. sufficient number for statistical practices), the average and standard deviation of those points are automatically calculated. The automatic calculation routine removes points that are not representative of the dataset before calculation of the average and standard deviation. The number of points present before calculation of the limits is specified by "a required number of points before automatic calculation" and is specified per parameter. The required number of points can be acquired following installation or preceding installation, or include points acquired during a pre-population of the database during installation. The pre-population of the database can occur, for example, for tools storing historical data prior to APC system installation. The average and standard deviation thus calculated are then used to calculate the upper and lower control limits of the SPC chart.

Two techniques are available for automatic calculation of the control limits, namely, as a percentage of the mean and as a multiple of the standard deviation from the mean. The upper limit can be calculated as a percentage above the average value, such as 5% to 10%, or as the average value plus the specified multiple (factor) of the standard deviation, such as 2 to 6σ. The lower limit can be calculated as a percentage below the average value, such as 5% to 10%, or as the average value minus the specified multiple of the standard deviation, such as 2 to 6σ. The percentage to use or multiple to use is specified per parameter, and a GUI screen can provide the means for entering and/or editing the percentage and the multiple. In addition, warning limits can also be provided on some SPC charts and can be determined in a similar manner.

In an alternate embodiment, a new upper control limit (UCL) and a new lower control limit (LCL) are determined for a current substrate run as a fraction of the old values for a prior substrate run and a fraction of the calculated values as described above. For example, the new control limit can comprise application of a correction filter, such as an exponentially weighted moving average (EWMA) filter, to update the control limits using the old value for the current observation (i.e., substrate run), the calculated value for the current observation (i.e., substrate run), and a filter constant, viz.

$$UCL_{new}=(1-\lambda)UCL_{old}+\lambda(UCL_{calculated}), \quad (1a)$$

$$LCL_{new}=(1-\lambda)LCL_{old}+\lambda(LCL_{Calculated}), \quad (1b)$$

where $\lambda$ is the EWMA filter coefficient ($0 \leq \lambda \leq 1$), $UCL_{old}$ and $LCL_{old}$ are the (old) control limit values for the prior run, and $UCL_{calculated}$ and $LCL_{calculated}$ are the calculated control limit values as described above for the current run. Note that when $\lambda=0$, the new control limit value is equivalent to the old control limit value and, when $\lambda=1$, the new control limit value is equivalent to the calculated control limit value.

After the control limits have been established, run rule evaluation (which run rule to use) is specified per parameter. Once the upper and low control limits are established, for a given chart, run rule evaluation is enabled for that chart. In addition, when upper and lower warning limits are determined, for a given chart, run rule evaluation can also include cases based on the warning limits.

Figure 4:
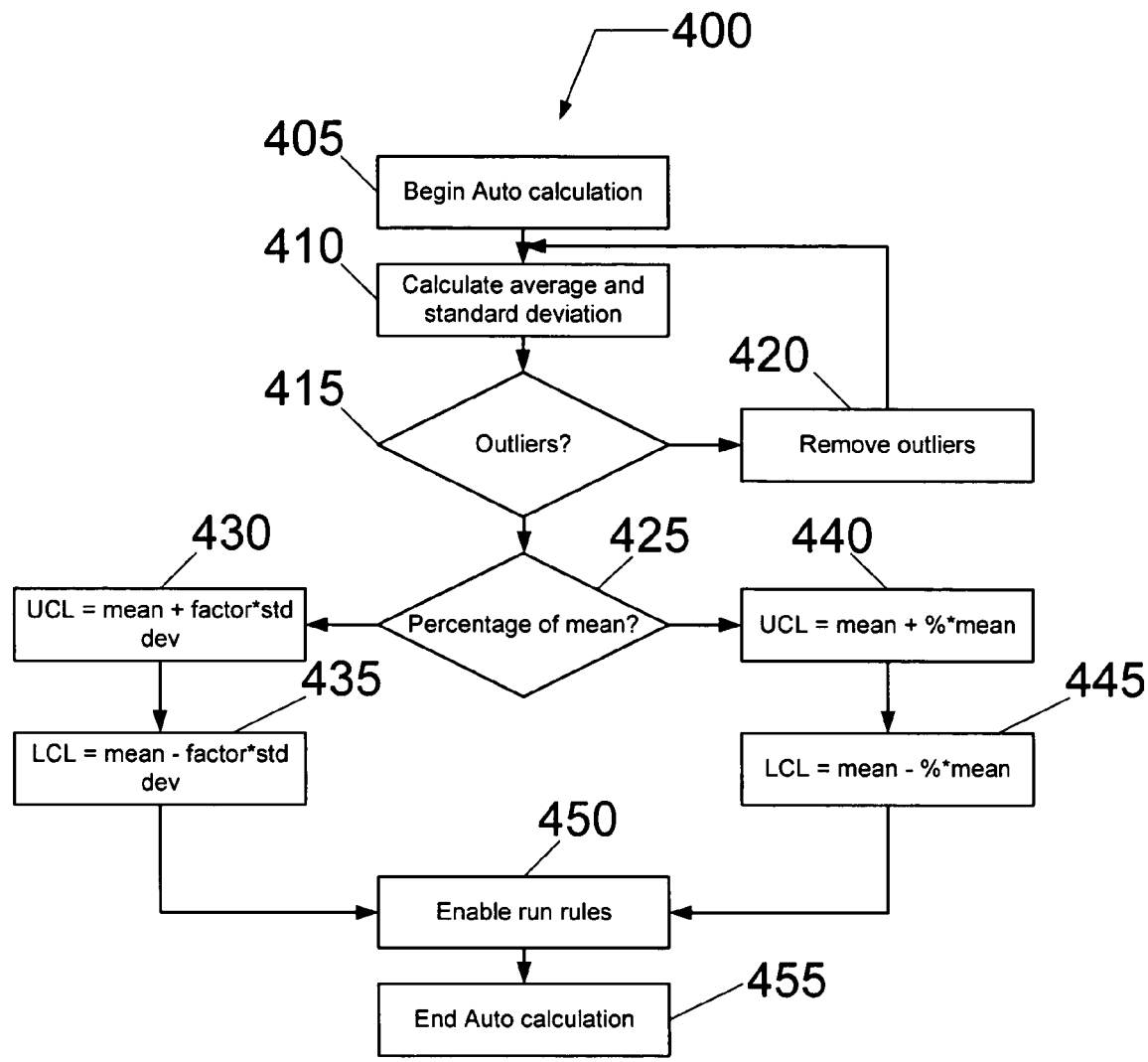
FIG. 4 presents a flowchart describing the automatic calculation of control limits for an SPC chart according to an embodiment of the present invention.

FIG. 4 illustrates a flow chart that presents a method 400 for automatic calculation of the control limits for a given SPC chart. At 405, the Auto calculation algorithm is initiated. At 410, the average (mean) and standard deviation are calculated for the data presented in the SPC chart. At 415, data outliers are detected, and, if necessary, removed at 420.

At 425, a determination of the type of control limits to be established is made. If a standard deviation is to be used, then an upper control limit (UCL) is calculated at 430 using UCL=mean+factor*standard deviation, and a lower control limit (LCL) is calculated at 435 using LCL=mean−factor*standard deviation; wherein factor is chosen to impose a number of standard deviations such as three (3). If a percentage of the mean is to be used, then an upper control limit (UCL) is calculated at 440 using UCL=mean+% *mean, and a lower control limit (LCL) is calculated at 445 using LCL=mean−% *mean. In an alternate embodiment, as described above, new control limits can be set using the aforementioned calculated values for a current substrate run, the old values for a prior substrate run, and, for example, an EWMA filter.

At 450, run rules can be enabled, and at 455, the Auto calculation algorithm is terminated. In alternate embodiments, a similar method can be used to determine warning limits.

Additional embodiments of the auto-configuration system for the automatic calculation of SPC limits for parameters that are representative of a process step can include any of the following: (1) if the "automatic SPC chart calculation" flag is "enabled" and once an auto-SPC chart has accumulated a configurable "number of points", the average and standard deviation of the dataset can be automatically calculated; (2) the automatic calculation of the average and standard deviation can exclude points that are determined to be outliers or are not representative of the data; (3) the number of points required to trigger the automatic calculation of the average and standard deviation can be specified by the "number of points" parameter; (4) a GUI can be available to enter the "number of points" parameter; (5) the "number of points" parameter thus entered can be a number greater than three (3); (6) the limits can be automatically calculated based on the percentage deviation from the average or by a factor times the standard deviation, and a flag can specify which calculation to use per parameter; (7) if the standard deviation option is chosen, the upper control limit can be calculated as the average plus a "multiple" of the standard deviation; (8) if the standard deviation option is chosen, the lower control limit can be calculated as the average minus a "multiple" of the standard deviation; (9) a GUI can be available to enter the "multiple" (or factor) to use in the limits calculation; (10) a GUI can be available to enter the "percentage" (%) to use in the limits calculation; (11) a GUI can be available to select which calculation technique to use; (12) run rule evaluation can be enabled after the control limits have been set; (13) run rule selection (which run rules to evaluate) can be specified by parameter; (14) run rule selection (which run rules to evaluate) can be available for editing using a GUI; and/or (15) the limits that are established automatically can be available for editing using the normal SPC chart GUI. The parameters can be, for example, univariate or multivariate.

Alternately, the auto-configuration system can provide the capability of automatic creation of a SPC chart for a stability step duration. A stability step duration comprises stability steps to allow for the conditions in the process module to become stable before processing begins. The duration of a stability step is variable and depends on the recipe settings and process module state. The tool recipe specifies a maximum length of time for the specific process parameter, such as pressure in an etch system, to stabilize. Because the trace parameters are varying during a stability step, the normal step summary parameters (average, standard deviation, minimum, maximum) have little or no value.

One "stability step duration" SPC chart per module can be included by default. By default, the "stability step" SPC chart is associated with "stability step duration" parameters per module. Control limits are specified by the "stability step" SPC chart per module.

Additional embodiments of the auto-configuration system for the automatic creation of a SPC chart for stability step duration can include any of the following: (1) in the following, stability step is defined as "a step during which a summary parameter value (for example, forward RF power to a lower electrode) is less than the threshold value"; (2) a GUI can be available to allow the user to select the summary parameter used to define a process step, such as an RF step in an etch system; (3) a GUI can be available to allow the user select the threshold value; (4) the system can have the ability to create a single parameter representing the duration of a stability step and defined as the duration, in seconds, of the stability step; (5) at run-time, for each of the selected stability steps, a new summary variable—representing the duration of the stability step can be created, and the results can be posted to the summary calculation table(s); (6) the stability step durations thus selected can be maintained in both the persistent database and the in-memory database; (7) an SPC chart per process module can be created for posting of stability step duration; (8) the posting each of the stability step duration parameter to the per process module "stability step duration" SPC chart can be controlled by the setting of the "stability step duration" flag; (9) by default, the lower and upper control limits of this chart can set the limits in the default "stability step duration" SPC "chart created for this purpose; (10) a GUI can be available to allow the user to change the lower and upper control limits of the "stability step duration" SPC "chart"; (11) the context information (tool, process module, recipe, step, parameter, value, date/time) of each point sent to the "stability step duration" SPC "chart" can be available from the SPC chart database; (12) the context information of each point sent to the "stability step duration" SPC chart can be viewable from the SPC chart; (13) at run time, each point that violates an SPC run rule can generate an "alarm"; (14) the available intervention and notification performed on this alarm can be the same as the current SPC interventions and notifications; (15) the alarm can include the context information of the wafer that caused the alarm; and/or (16) default interventions and notifications can be specified by the "default interventions and notifications for stability step duration" SPC chart. The SPC chart can be of univariate or multivariate data.

Alternately, the auto-configuration system can provide the capability of automatic creation of a SPC chart for JUST PROCESS step duration. If selected in the list of enabled parameters, a chart can be created for each non-zero occurrence of the parameter "JUST PROCESS". In principle there can be as many JUST PROCESS times as there are steps. In practice, there can typically exist as many as three JUST PROCESS times recorded during a process recipe. In actual practice, there can be only one JUST PROCESS time per recipe, since in practice, usually only one process recipe step uses, for example, an etch process having end point detection. When the JUST PROCESS parameter is zero it means that no end point was called. In this case, the JUST PROCESS parameter is ignored by this feature. If enabled, an SPC chart will be created for each non-zero JUST PROCESS parameters found at run-time. By default, the lower and upper control limits of this chart can set the limits in the default "JUST PROCESS" SPC "chart" created for this purpose. The SPC chart can be of univariate or multivariate data.

Additional embodiments of the auto-configuration system for the automatic creation of a SPC chart for JUST PROCESS step duration can include any of the following: (1) in the following, JUST PROCESS is defined as a parameter value that is recorded once per step to indicate the time at which end point was called, and in the APC system there are, for example, 24 such parameters corresponding to the maximum number of steps allowed on the current tool software; (2) a GUI can be available to allow the user to select JUST PROCESS as an enabled parameter for automatic SPC chart creation; (3) at run-time, for each step for which the JUST PROCESS parameter is non-zero, an SPC chart can be created; (4) the JUST PROCESS durations thus selected can be maintained in both the persistent database and the in-memory database; (5) a GUI can be available to allow the user to change the lower and upper control limits of the "JUST PROCESS" SPC "chart"; (6) the context information (tool, process module, recipe, step, parameter, value, date/time) of each point sent to the "JUST PROCESS" SPC "chart" can be available from the SPC chart database; (7) the context information of each point sent to a JUST PROCESS SPC chart can be viewable from the SPC chart; (8) at run time, each point that violates an SPC run rule can generate an "alarm"; (9) the available intervention and notification performed on this alarm can be the same as the conventional SPC interventions and notifications; (10) the alarm can include the context information of the wafer that caused the alarm; and/or (11) default interventions and notifications can be specified by the "default interventions and notifications for JUST PROCESS".

Although only certain exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A method of automatically configuring an Advanced Process Control (APC) system for a semiconductor manufacturing environment comprising:
   generating an auto-configuration script for executing an auto-configuration program, wherein said auto-configuration script activates default values for input to said auto-configuration program;
   executing said auto-configuration script to generate an enabled parameter file output from said auto-configuration program, wherein said enabled parameter file identifies parameters for statistical process control (SPC) chart generation; and
   generating control limits for at least one of said at least one SPC charts, wherein said generating comprises automatic calculation of said control limits per the execution of said auto-configuration script.

2. The method as recited in claim 1 further comprising:
   generating an auto-configuration data tile configured to be read by said auto-configuration program, wherein said auto-configuration data file comprises at least one of a list of enabled parameters and flags for overriding said default values.

3. The method as recited in claim 1 further comprising:
   generating & least one SPC chart for at least one of said enabled parameters, wherein said generating comprises automatic creation of said SPC chart per the execution of said auto-configuration script.

4. The method as recited in claim 1, wherein said control limits comprise at least one of an upper control limit and a lower control limit.

5. The method as recited in claim 1, wherein said control limits are automatically calculated once a required number of data points are achieved in said SPC chart.

6. The method as recited in claim 5, wherein outliers of said required number of data points are removed.

7. The method as recited in claim 5, wherein said control limits are calculated based upon a percentage of a mean of said required number of data points in said SPC chart.

8. The method as recited in claim 5, wherein said control limits are calculated based upon a multiplication of a factor and a standard deviation of said required number of data points in said SPC chart.

9. The method as recited in claim 7, wherein said upper control limit (UCL) is determined by UCL=mean+percentage*mean, and said lower control limit (LCL) is determined by LCL=mean−percentage*mean.

10. The method as recited in claim 8, wherein said upper control limit (UCL) is determined by UCL=mean+factor*standard deviation, and said lower control limit (LCL) is determined by LCL=mean−factor*standard deviation.

11. The method as recited in claim 9, wherein said percentage is user specified.

12. The method as recited in claim 11, wherein said percentage is specified using a spreadsheet.

13. The method as recited in claim 11, wherein said percentage is specified using a GUI.

14. The method as recited in claim 10, wherein said factor is user specified.

15. The method as recited in claim 14, wherein said factor is specified using a spreadsheet.

16. The method as recited in claim 14, wherein said factor is specified using a GUI.

17. The method as recited in claim 5, wherein said required number of data points is user specified.

18. The method as recited in claim 17, wherein said required number of data points is specified using a spreadsheet.

19. The method as recited in claim 17, wherein said required number of data points is specified using a GUI.

20. The method as recited in claim 5, wherein said required number of data points comprises a number of data points acquired during a pre-population of the APC system.

21. The method as recited in claim 8, further comprising:
    configuring run rule evaluations for said at least one SPC chart; and
    enabling said run rule evaluations.

22. The method as recited in claim 21, wherein said rim rule evaluations are configured by a user.

23. The method as recited in claim 22, wherein said factor is specified using a spreadsheet.

24. The method as recited in claim 22, wherein said factor is specified using a GUI.

25. The method as recited in claim 5, wherein said automatically calculated control limits are determined for a current substrate run and are utilized to update old control limits from a prior substrate run.

26. The method as recited in claim 25, wherein a new control limit is equivalent to $(1-\lambda)*$said old value$+\lambda*$(said calculated value), said $\lambda$ is a filter constant and ranges from a value of 0 to 1.

27. The method as recited in claim 9, wherein said determined upper control limit (UCL) is determined for a current substrate run and is utilized to update an old upper control limit from a prior substrate run.

28. The method as recited in claim 10, wherein said determined upper control limit (UCL) is determined for a current substrate run and is utilized to update an old upper control limit from a prior substrate run.

29. The method as recited in claim 27, wherein a new upper control limit is equivalent to $(1-\lambda)*$said old upper control limit$+\lambda*$(said determined upper control limit), said $\lambda$ is a filter constant and ranges from a value of 0 to 1.

30. The method as recited in claim 28, wherein a new upper control limit is equivalent to $(1-\lambda)*$said old upper control limit$+\lambda*$(said determined upper control limit), said $\lambda$ is a filter constant and ranges from a value of 0 to 1.

31. The method as recited in claim 9, wherein said determined lower control limit (LCL) is determined for a current substrate run and is utilized to update an old lower control limit from a prior substrate run.

32. The method as recited in claim 10, wherein said determined lower control limit (LCL) is determined for a current substrate run and is utilized to update an old lower control limit from a prior substrate run.

33. The method as recited in claim 31, wherein a new lower control limit is equivalent to $(1-\lambda)*$said old lower control limit$+\lambda*$(said determined lower control limit), said $\lambda$ is a filter constant and ranges from a value of 0 to 1.

34. The method as recited in claim 32, wherein a new lower control limit is equivalent to $(1-\lambda)$ said old lower control limit$+\lambda*$(said determined lower control limit), said $\lambda$ is a filter constant and ranges from a value of 0 to 1.

35. The method as recited in claim 3, wherein said at least one SPC chart is accessible remotely via the Internet.

36. The method as recited in claim 1, wherein said control limits are accessible via the Internet.

* * * * *